(12) United States Patent
Sisler et al.

(10) Patent No.: US 9,550,908 B2
(45) Date of Patent: *Jan. 24, 2017

(54) SACRIFICIAL COATING FOR INTERMEDIATE TRANSFER MEMBER OF AN INDIRECT PRINTING APPARATUS (71) Applicant: XEROX CORPORATION, Norwalk, CT (US)

(72) Inventors: Gordon Sisler, Ontario (CA); Guiqin Song, Milton (CA); Marcel P. Breton, Mississauga (CA); Suxia Yang, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,398

(22) Filed: Sep. 23, 2014

(65) Prior Publication Data

US 2016/0083606 A1    Mar. 24, 2016

(51) Int. Cl.
*B41J 2/21*       (2006.01)
*C09D 129/04*    (2006.01)
(Continued)

(52) U.S. Cl.
CPC .......... *C09D 129/04* (2013.01); *B41J 2/0057* (2013.01); *C09D 7/1233* (2013.01); *C09D 103/12* (2013.01); *C09D 133/10* (2013.01); *C09D 133/26* (2013.01); *C09D 139/06* (2013.01); *C09D 171/02* (2013.01); *C08K 5/053* (2013.01); *C08K 5/06* (2013.01); *C08K 5/5419* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS 4,339,553 A    7/1982  Yoshimura et al.
4,970,098 A   11/1990  Ayala-Esquilin et al.
(Continued)

FOREIGN PATENT DOCUMENTS

EP    1900527 A1    3/2008
EP    2228690 A1    9/2010
WO    2005047385 A1  5/2005

OTHER PUBLICATIONS

"Dimer Acids," Kirk-Othmer Encyclopedia of Chemical Technology, vol. 8, 4th Ed. (1992), pp. 223-237.
(Continued)

*Primary Examiner* — Manish S Shah
(74) *Attorney, Agent, or Firm* — MH2 Technology Law Group LLP (57) ABSTRACT

A coating composition for an image transfer member in an aqueous ink imaging system. The coating composition includes at least one hydrophilic polymer, at least one hygroscopic material, at least one oil-in-water emulsion and at least one surfactant.

18 Claims, 6 Drawing Sheets

(51) Int. Cl.
*B41J 2/005* (2006.01)
*C09D 103/12* (2006.01)
*C09D 7/12* (2006.01)
*C09D 133/10* (2006.01)
*C09D 133/26* (2006.01)
*C09D 139/06* (2006.01)
*C09D 171/02* (2006.01)
*C08K 5/053* (2006.01)
*C08K 5/5419* (2006.01)
*C08K 5/06* (2006.01)

(56) References Cited

U.S. PATENT DOCUMENTS

| | | |
|---|---|---|
| 4,997,642 A | 3/1991 | Curtis et al. |
| 5,145,518 A | 9/1992 | Winnik et al. |
| 5,146,087 A | 9/1992 | Vandusen |
| 5,202,265 A | 4/1993 | LaMora |
| 5,208,630 A | 5/1993 | Goodbrand et al. |
| 5,225,900 A | 7/1993 | Wright |
| 5,231,135 A | 7/1993 | Machell et al. |
| 5,256,193 A | 10/1993 | Winnik et al. |
| 5,271,764 A | 12/1993 | Winnik et al. |
| 5,275,647 A | 1/1994 | Winnik |
| 5,286,286 A | 2/1994 | Winnik et al. |
| 5,301,044 A | 4/1994 | Wright |
| 5,378,574 A | 1/1995 | Winnik et al. |
| 5,385,803 A | 1/1995 | Duff et al. |
| 5,464,703 A | 11/1995 | Ferrar et al. |
| 5,474,852 A | 12/1995 | Fitzgerald et al. |
| 5,494,702 A | 2/1996 | Blaine et al. |
| 5,539,038 A | 7/1996 | Katsen et al. |
| 5,543,177 A | 8/1996 | Morrison et al. |
| 5,547,759 A | 8/1996 | Chen et al. |
| 5,554,480 A | 9/1996 | Patel et al. |
| 5,593,807 A | 1/1997 | Sacripante et al. |
| 5,621,022 A | 4/1997 | Jaeger et al. |
| 5,629,416 A | 5/1997 | Neigel et al. |
| 5,695,878 A | 12/1997 | Badesha et al. |
| 5,700,568 A | 12/1997 | Badesha et al. |
| 5,736,520 A | 4/1998 | Bey et al. |
| 5,744,200 A | 4/1998 | Badesha et al. |
| 5,750,204 A | 5/1998 | Badesha et al. |
| 5,753,307 A | 5/1998 | Badesha et al. |
| 5,808,645 A * | 9/1998 | Reeves ............... B41J 2/0057 347/103 |
| 5,841,456 A | 11/1998 | Takei et al. |
| 5,945,245 A | 8/1999 | Mychajlowskij et al. |
| 6,020,300 A | 2/2000 | Tcheou et al. |
| 6,042,227 A | 3/2000 | Meinhardt et al. |
| 6,051,562 A | 4/2000 | Chamberlain et al. |
| 6,103,815 A | 8/2000 | Mammino et al. |
| 6,156,858 A | 12/2000 | Keoshkerian et al. |
| 6,221,137 B1 | 4/2001 | King et al. |
| 6,348,509 B1 | 2/2002 | Reeve |
| 6,586,100 B1 | 7/2003 | Pickering et al. |
| 7,172,276 B2 | 2/2007 | Breton et al. |
| 7,202,883 B2 | 4/2007 | Breton et al. |
| 7,281,790 B2 | 10/2007 | Mouri et al. |
| 7,294,377 B2 | 11/2007 | Gervasi et al. |
| 7,374,812 B2 | 5/2008 | Mizuno |
| 7,608,325 B2 | 10/2009 | Rasch et al. |
| 7,767,011 B2 | 8/2010 | Bedford et al. |
| 7,780,286 B2 | 8/2010 | Yahiro |
| 8,038,284 B2 | 10/2011 | Hori et al. |
| 8,136,936 B2 | 3/2012 | Hook et al. |
| 8,142,557 B2 | 3/2012 | Belelie et al. |
| 8,215,762 B2 | 7/2012 | Ageishi |
| 8,247,066 B2 | 8/2012 | Wu |
| 8,268,399 B2 | 9/2012 | Gervasi et al. |
| 8,350,879 B2 | 1/2013 | Larson et al. |
| 8,500,269 B2 | 8/2013 | Morita |
| 8,919,252 B2 | 12/2014 | Lestrange et al. |
| 9,011,594 B1 | 4/2015 | Kanungo et al. |
| 9,022,546 B1 | 5/2015 | Breton et al. |
| 9,126,430 B2 | 9/2015 | Liu |
| 9,138,985 B1 | 9/2015 | Yang et al. |
| 9,174,432 B2 | 11/2015 | Liu et al. |
| 9,187,587 B2 | 11/2015 | Kanungo et al. |
| 9,193,209 B2 | 11/2015 | Dooley et al. |
| 9,211,697 B2 | 12/2015 | Dooley et al. |
| 9,227,393 B2 | 1/2016 | Song et al. |
| 9,259,915 B2 | 2/2016 | Dooley et al. |
| 9,273,218 B2 | 3/2016 | Liu |
| 9,284,469 B2 | 3/2016 | Song et al. |
| 9,303,135 B2 | 4/2016 | Eliyahu et al. |
| 9,303,185 B2 | 4/2016 | Sambhy et al. |
| 9,327,519 B1 | 5/2016 | Larson et al. |
| 9,353,290 B2 | 5/2016 | Condello et al. |
| 2002/0064648 A1 | 5/2002 | Schlueter et al. |
| 2003/0067528 A1 | 4/2003 | Chowdry et al. |
| 2003/0233952 A1 | 12/2003 | Pan et al. |
| 2003/0233953 A1 | 12/2003 | Pan et al. |
| 2003/0234840 A1 | 12/2003 | Pan et al. |
| 2004/0158056 A1 | 8/2004 | Heimstra et al. |
| 2004/0253436 A1 | 12/2004 | Heeks et al. |
| 2005/0018027 A1 | 1/2005 | Pan et al. |
| 2006/0008599 A1* | 1/2006 | Hiyama ............... B41M 5/52 428/32.24 |
| 2006/0105117 A1 | 5/2006 | Kim et al. |
| 2006/0152566 A1* | 7/2006 | Taniuchi ............... B41J 2/0057 347/103 |
| 2007/0207186 A1 | 9/2007 | Scanlon et al. |
| 2007/0207269 A1* | 9/2007 | Woodhall ............... B05D 1/327 427/282 |
| 2007/0266896 A1 | 11/2007 | Suwa et al. |
| 2008/0032072 A1 | 2/2008 | Taniuchi et al. |
| 2008/0055381 A1 | 3/2008 | Doi et al. |
| 2008/0206571 A1 | 8/2008 | Berckmans et al. |
| 2009/0110942 A1 | 4/2009 | Henderson-Rutgers et al. |
| 2009/0152664 A1 | 6/2009 | Klem et al. |
| 2009/0237479 A1 | 9/2009 | Yamashita et al. |
| 2011/0018925 A1 | 1/2011 | Ohara |
| 2011/0025752 A1 | 2/2011 | Law et al. |
| 2011/0122195 A1 | 5/2011 | Kovacs et al. |
| 2011/0122210 A1 | 5/2011 | Sambhy et al. |
| 2011/0269849 A1 | 11/2011 | Yao |
| 2012/0039648 A1 | 2/2012 | Sambhy et al. |
| 2012/0042518 A1 | 2/2012 | Law et al. |
| 2012/0083530 A1 | 4/2012 | Mai et al. |
| 2012/0103212 A1 | 5/2012 | Stowe et al. |
| 2012/0135650 A1 | 5/2012 | Servante et al. |
| 2012/0140009 A1 | 6/2012 | Kanasugi et al. |
| 2012/0162312 A1 | 6/2012 | Ahl et al. |
| 2012/0251685 A1 | 10/2012 | Wang-Nolan et al. |
| 2012/0274914 A1 | 11/2012 | Stowe et al. |
| 2012/0283098 A1 | 11/2012 | Zhang et al. |
| 2012/0301818 A1 | 11/2012 | Gilmartin et al. |
| 2013/0266803 A1 | 10/2013 | Dooley et al. |
| 2013/0272763 A1 | 10/2013 | Moorlag et al. |
| 2014/0060352 A1 | 3/2014 | Gervasi et al. |
| 2014/0060357 A1 | 3/2014 | Hsieh |
| 2014/0060359 A1 | 3/2014 | Kanungo et al. |
| 2014/0060360 A1 | 3/2014 | Moorlag et al. |
| 2014/0060361 A1 | 3/2014 | Gervasi et al. |
| 2014/0060363 A1 | 3/2014 | Kelly et al. |
| 2014/0060365 A1 | 3/2014 | Gervasi et al. |
| 2014/0154377 A1 | 6/2014 | Wang-Nolan et al. |
| 2014/0168330 A1 | 6/2014 | Liu et al. |
| 2014/0307800 A1 | 10/2014 | Condello et al. |
| 2015/0004861 A1 | 1/2015 | Gervasi et al. |
| 2015/0022602 A1 | 1/2015 | Landa et al. |
| 2015/0031806 A1 | 1/2015 | Lim et al. |
| 2015/0085036 A1 | 3/2015 | Liu |
| 2015/0085039 A1 | 3/2015 | Liu |
| 2015/0116414 A1 | 4/2015 | Eliyahu et al. |
| 2015/0119510 A1 | 4/2015 | Eliyahu et al. |
| 2015/0165758 A1 | 6/2015 | Sambhy et al. |
| 2015/0258778 A1 | 9/2015 | Dooley et al. |
| 2015/0267078 A1 | 9/2015 | Dooley |
| 2015/0275022 A1 | 10/2015 | Chen et al. |
| 2015/0291847 A1 | 10/2015 | Condello et al. |
| 2015/0315403 A1 | 11/2015 | Song et al. |
| 2015/0315409 A1 | 11/2015 | Song et al. |

(56) References Cited

U.S. PATENT DOCUMENTS

| | | |
|---|---|---|
| 2015/0343797 A1 | 12/2015 | Song et al. |
| 2016/0083607 A1 | 3/2016 | Sisler et al. |
| 2016/0083609 A1 | 3/2016 | Sisler et al. |
| 2016/0083636 A1 | 3/2016 | Yoshida et al. |
| 2016/0089875 A1 | 3/2016 | Song et al. |
| 2016/0176185 A1 | 6/2016 | Kanungo et al. |

OTHER PUBLICATIONS

Author Unknown, "Chemical reactions on the "finished" silicone", Silicones Europe, http://www.silicones.eu/science-research/chemistry/chemical-reactions-on-the-finished-silicone, accessed Dec. 13, 2014, pp. 1-4.
Jikei et al. "Synthesis and Properties of Hyperbranched Aromatic Polyamide Copolymers from AB and AB2 Monomers by Direct Polycondensation", Macromolecules 2000, 33, pp. 6228-6234 (2000).
Song, et al., "Compositions and Use of Compositions in Printing Processes", U.S. Appl. No. 14/502,202, filed Sep. 30, 2014.
Kanungo, et al., "Multilayer Imaging Blanket Coating", U.S. Appl. No. 14/576,734, filed Dec. 19, 2014.
Song, et al., "Sacrificial Coating and Indirect Printing Apparatus Employing Sacrificial Coating on Intermediate Transfer Member", U.S. Appl. No. 14/665,319, filed Mar. 23, 2015.
Larson, et al., "Sacrificial Coating and Indirect Printing Apparatus Employing Sacrificial Coating on Intermediate Transfer Member", U.S. Appl. No. 14/830,557, filed Aug. 19, 2015.
Larson, et al., "Sacrificial Coating and Indirect Printing Apparatus Employing Sacrificial Coating on Intermediate Transfer Member", U.S. Appl. No. 14/867,864, filed Sep. 28, 2015.
http://www2.dupont.com/Elvanol/en_US/assets/downloads/elvanol_51_05.pdf, 2006.
Dow, Dow Surfacants, http://www.dow.com/surfacants/products/second.htm, retrieved Mar. 10, 2014, pp. 1-2.
Dow, Material Safety Data Sheet, Tergitol(TM) TMN-6 (90% AQ), The Dow Chemical Company, Feb. 12, 2003, pp. 1-15.
Dow, Product Safety Assessment, TRITON CF Series Surfactants, Dec. 16, 2012, 6 pages.
Wikipedia, Hydrocarbon, Downloaded Mar. 2, 2016, 8 pages.
Reddy et al., "Citric acid cross-linking of starch films," University of Nebraska—Lincoln, Faculty Publications—Textiles, Merchandising and Fashion Design, Paper 25, 2009, pp. 702-711.
Wikipedia, "Tricarboxylic Acid," 2 pages printed on Aug. 19, 2015.
Wikipedia, "Dicarboxylic Acid," 7 pages printed on Aug. 19, 2015.
Wikipedia, "Tetracarboxylic acids", 2 pages printed on Aug. 19, 2015, https://commons.wikimedia.org/wiki/Category:Tetracarboxylic_acids.
Author Unknown, Byk-Silclean 3700 by Byk Chemie, http://www.specialchem4coatings.com/tds/byk-silclean-3700/byk-chemie/10414/index.aspx?q=Byk%20Silclean%203700, 2013, 1 page.
Author Unknown, Desmodur N 3790 BA, Bayer MaterialScience, LLC., http://www.bayermaterialsciencenafta.com/products/index.cfm?mode=lit&pp_num=EB7C52DD-F4EC-BDA1-6BE0225FEE5C1FD0&pg_num=EB7C5520-9065-98A0-5A4CD71113D57191&pf=0&pf=1, 2007, 1 page.
Author Unknown, "Dot Tool", Quality Engineering Associates, Inc., pp. 1-3.
Author Unknown, "Products and Properties: Desmodur/Desmophen for Coatings, Commercial Products", Bayer MaterialScience AG brochure, Edition: Jul. 2005 E, 28 pages.
Berset 2185, Technical Data Sheet, Mar. 14, 2012, 2 pages.
Cabot, "Specialty Carbon Blacks for Ultraviolet Protection & Weatherability", Cabot Corporation, 2 pages.
Law et al., "Self Cleaning Polymers and Surfaces", TechConnect World Conference & Expo, Jun. 13-16, 2011, abstract of presentation, 1 page.
Ming-Kai Tse, "PIAS-II TM—A Hig-performance Portable tool for Print Quality Analysis Anytime, Anywhere", Quality Engineering Associates (QEA), Inc. pp. 1-4.
Philipp, et al., "Three Methods for In Situ Cross-Linking of Polyvinyl Alcohol Films for Application as Ion-Conducting Membranes in Potassium Hydroxide Electrolyte", NASA, Apr. 1979,18 pages.
Song, "Starch crosslinking for cellulose fiber modification and starch nanoparticle formation", https://smarttech.gatech.edu/handle/1853/39524?show=full, downloaded Jan. 22, 2015, 4 pages.
Wang, et al , "Preparation of a Crosslinking Cassava Starch Adhesive and its Application in Coating Paper", BioResources, 2013, 8 (3), pp. 3574-3589.
Bruce E. Kahn, "The M3D Aerosol Jet System, An Alternative to Inkjet Printing for Printed Electronics", Organic and Printed Electronics, vol. 1, Issue 1, Winter 2007, pp. 14-17.
Jikei et al., "Synthesis and Properties of Hyperbranched Aromatic Polyamide Copolymers from AB and AB2 Monomers by Direct Polycondensation", Macromolecules 2000, 33, pp. 6228-6234.

* cited by examiner

SACRIFICIAL COATING FOR INTERMEDIATE TRANSFER MEMBER OF AN INDIRECT PRINTING APPARATUS

DETAILED DESCRIPTION

Field of the Disclosure

This disclosure relates generally to indirect inkjet printers, and in particular, to a sacrificial coating employed on an intermediate transfer member of an inkjet printer.

Background

In aqueous ink indirect printing, an aqueous ink is jetted on to an intermediate imaging surface (sometimes referred to herein as an intermediate transfer member), which can be in the form of a blanket. The ink is partially dried on the blanket prior to transfixing the image to a media substrate, such as a sheet of paper. To ensure excellent print quality it is desirable that the ink drops jetted onto the blanket spread and become well-coalesced prior to drying. Otherwise, the ink images appear grainy and have deletions. Lack of spreading can also cause missing or failed inkjets in the printheads to produce streaks in the ink image. Spreading of aqueous ink is facilitated by materials having a high energy surface.

In order to facilitate transfer of the ink image from the blanket to the media substrate after the ink is dried on the intermediate imaging surface, a blanket having a surface with a relatively low surface energy is preferred. Rather than providing the desired spreading of ink, low surface energy materials tend to promote "beading" of individual ink drops on the image receiving surface.

Thus, an optimum blanket for an indirect image transfer process must tackle both the challenges of wet image quality, including desired spreading and coalescing of the wet ink; and the image transfer of the dried ink. The first challenge—wet image quality—prefers a high surface energy blanket that causes the aqueous ink to spread and wet the surface. The second challenge—image transfer—prefers a low surface energy blanket so that the ink, once partially dried, has minimal attraction to the blanket surface and can be transferred to the media substrate.

Various approaches have been investigated to provide a solution that balances the above challenges. These approaches include blanket material selection, ink design and auxiliary fluid methods. With respect to material selection, materials that are known to provide optimum release properties include the classes of silicone, fluorosilicone, a fluoropolymer, such as TEFLON or VITON, and certain hybrid materials. These materials have low surface energy, but provide poor wetting. Alternatively, polyurethane and polyimide have been used to improve wetting, but at the cost of ink release properties. Tuning ink compositions to address these challenges has proven to be very difficult since the primary performance attribute of the ink is the performance in the print head. For instance, if the ink surface tension is too high it will not jet properly and it if is too low it will drool out of the face plate of the print head.

Identifying and developing new techniques and/or materials that improve wet image quality and/or image transfer would be considered a welcome advance in the art.

SUMMARY

An embodiment of the present disclosure is directed to a coating composition for an image transfer member in an aqueous ink imaging system. The coating composition comprises: at least one hydrophilic polymer; at least one hygroscopic material; at least one oil-in-water emulsion; and at least one surfactant.

Another embodiment of the present disclosure is directed to an indirect printing apparatus. The indirect printing apparatus comprises an intermediate transfer member and a sacrificial coating on the intermediate transfer member. The sacrificial coating is made from ingredients comprising: at least one hydrophilic polymer; at least one hygroscopic material; at least one oil-in-water emulsion; and at least one surfactant. The indirect printing apparatus further comprises a coating mechanism for forming the sacrificial coating onto the intermediate transfer member; a drying station for drying the sacrificial coating; at least one ink jet nozzle positioned proximate the intermediate transfer member and configured for jetting ink droplets onto the sacrificial coating formed on the intermediate transfer member; an ink processing station configured to at least partially dry the ink on the sacrificial coating formed on the intermediate transfer member; and a substrate transfer mechanism for moving a substrate into contact with the intermediate transfer member.

Yet another embodiment of the present disclosure is directed to an indirect printing process. The process comprises providing an ink composition to an inkjet printing apparatus comprising an intermediate transfer member. A sacrificial coating is formed onto the intermediate transfer member. The sacrificial coating is made from ingredients comprising: at least one hydrophilic polymer; at least one hygroscopic material; at least one oil-in-water emulsion; and at least one surfactant. The droplets of ink are ejected in an imagewise pattern onto the sacrificial coating. The ink at least partially dried to form a substantially dry ink pattern on the intermediate transfer member. Both the substantially dry ink pattern and the sacrificial coating are transferred from the intermediate transfer member to a final substrate.

The sacrificial coating compositions of the present disclosure can provide one or more of the following advantages: coatings having good wettability, coatings having good ink wetting and ink spreading, image transfer member coatings exhibiting improved wet image quality and/or improved image transfer with aqueous inks, improved physical robustness or increased shelf life.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or liquid vehicle in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface.

As used in this document, the term "aqueous ink" includes liquid inks in which colorant is in a solution, suspension or dispersion with a liquid vehicle that includes water and/or one or more liquid vehicles. The term "liquid vehicle" is defined herein to include both liquid solvents that may dissolve a solute into a solution and liquid carriers that hold particles in a suspension or dispersion without dissolving the particle.

As used herein, the term "hydrophilic" refers to any composition or compound that attracts water molecules or other solvents or liquid carriers used in aqueous ink. As used herein, a reference to a hydrophilic composition refers to a liquid vehicle that carries a hydrophilic agent. Examples of liquid vehicles include, but are not limited to a liquid, such as water or alcohol, that carries a dispersion, suspension, or solution.

As used herein, a reference to a dried layer or dried coating refers to an arrangement of a hydrophilic compound after all or a substantial portion of the liquid vehicle has been removed from the composition through a drying process. As described in more detail below, an indirect inkjet printer forms a layer of a hydrophilic composition on a surface of an intermediate transfer member using a liquid vehicle, such as water, to apply a layer of the hydrophilic composition. The liquid vehicle is used as a mechanism to convey the hydrophilic composition to an image receiving surface to form a uniform layer of the hydrophilic composition on the image receiving surface.

An embodiment of the present disclosure is directed to a coating composition formed on an image transfer member in an aqueous ink imaging system. The coating comprises at least one hydrophilic polymer; at least one hygroscopic material; at least one oil-in-water emulsion and at least one surfactant.

Hydrophilic polymers can act as a binder in the compositions of the present disclosure. In an embodiment, the hydrophilic polymers are water soluble. For example, the hydrophilic polymers can be water soluble at temperatures below 100° C.

In an embodiment, the at least one hydrophilic polymer is selected from the group consisting of polyvinyl alcohol, a copolymer of vinyl alcohol and alkene monomers, poly(vinylpyrrolidinone) (PVP), poly(ethylene oxide), hydroxyethyl cellulose, cellulose acetate, poly(ethylene glycol), copolymers of poly(ethylene glycol), polyacrylamide (PAM), poly(N-isopropylacrylamide) (PNIPAM), poly(acrylic acid), polymethacrylate, acrylic polymers, maleic anhydride copolymers, sulfonated polyesters, polysaccharides, waxy maize starches and mixtures thereof. In an embodiment, the hydrophilic polymer is selected from waxy maize starches comprising more than 90 weight percent amylopectin, such as 93 or 95 weight percent amylopectin or more, relative to the total weight of the waxy maize.

In an embodiment, the hydrophilic polymer is selected from the group consisting of i) polyvinyl alcohol and ii) a copolymer of vinyl alcohol and alkene monomers. The polyvinyl alcohol (PVOH) and copolymers thereof can act as a binder in the compositions of the present disclosure. In an embodiment, the at least one hydrophilic polymer is polyvinyl alcohol. In an embodiment, the at least one polymer is a copolymer of polyvinyl alcohol and alkene monomers. Examples of suitable polyvinyl alcohol copolymers include poly(vinyl alcohol-co-ethylene). In an embodiment, the poly(vinyl alcohol-co-ethylene) has an ethylene content ranging from about 5 mol % to about 30 mol %. Other examples of polyvinyl copolymer include poly(acrylic acid)-poly(vinyl alcohol) copolymer, polyvinyl alcohol-acrylic acid-methyl methacrylate copolymer, poly(vinyl alcohol-co-aspartic acid) copolymer etc.

It is well known that PVOH can be manufactured by hydrolysis of polyvinyl acetate to form, for example, partially hydrolyzed (87-89%), intermediate hydrolyzed (91-95%), fully hydrolyzed (98-98.8%) to super hydrolyzed (more than 99.3%) polyvinyl alcohol. In an embodiment, the polyvinyl alcohol employed in the compositions of the present disclosure has a hydrolysis degree ranging from about 75% to about 99.5% or 99.3%, such as about 80% to about 95%, or about 85% to about 90%.

The polyvinyl alcohol or copolymer thereof can have any suitable molecular weight. In an embodiment, the weight average molecular weight ranges from about 8000 to about 30,000 g-mole$^{-1}$, such as from about 10,000 to about 25,000 g-mole$^{-1}$, or from about 13,000 to about 23,000 g-mole$^{-1}$.

In an embodiment, the polyvinyl alcohol can provide a suitable viscosity for forming a sacrificial coating on an intermediate transfer member. For example, at about 4% by weight polyvinyl alcohol in a solution of DI water, at 20° C. the viscosity can range from about 2 cps to about 100 cps, such as about 3 cps to about 15 or 30 cps, or about 3 cps to about 5 cps, where the % by weight is relative to the total weight of polyvinyl alcohol and water.

Polyvinyl alcohol is a hydrophilic polymer and has good water retention properties. As a hydrophilic polymer, the coating film formed from polyvinyl alcohol can exhibit good water retention properties, which can assist the ink spreading on the blanket. Because of its superior strength, the coatings formulated with polyvinyl alcohol can achieve a significant reduction in total solid loading level. This may provide substantial cost savings while providing a significant improvement of the coating film performance. In addition, the shelf life of PVOH based formulations can be relatively long compared to some polymers, such as starches. The mechanical properties of polyvinyl alcohol can be significantly better when compared to starches.

The chemical structure of the hydrophilic polymer containing coating can be tailored to fine-tune the wettability and release characteristics of the sacrificial coating from the underlying ITM surface. This can be accomplished by employing one or more hygroscopic materials and one or more surfactants in the coating composition.

Any suitable hygroscopic material can be employed. The hygroscopic material can be functionalized as a plasticizer. In an embodiment, the at least one hygroscopic material is selected from the group consisting of glycerol, sorbitol, glycols such as polyethylene glycol, vinyl alcohols, xylitol, maltitol, polymeric polyols, glyceryl triacetate, glycouril, ionic liquids and mixtures thereof. A single hygroscopic material can be used. Alternatively, multiple hygroscopic materials, such as two, three or more hygroscopic materials, can be used.

The addition of an oil-in-water emulsion to the undercoat formulation can further improve the ink transfer efficiency during the transfix process. In an embodiment, the oil-in-water emulsion includes a surfactant. Any suitable oil and surfactant combination that will provide the desired improvement in ink transfer efficiency can be employed.

Examples of oils include silicone oils, perfluoroether oils, hydrocarbon oils and mixtures thereof. In an embodiment, the oil is mineral oil selected from the group consisting of paraffinic oils, naphthenic oils, aromatic oils and mixtures thereof. Oil viscosity can range, for example, from about 10 cps to about 1000 cps, such as about 100 cps to about 900 cps, or about 200 cps to about 800 cps. In an embodiment, the viscosity of silicone oil is less than 1000 centipoises.

Any suitable surfactants can be employed. In an embodiment, the at least one surfactant is nonionic surfactant having a hydrophile lipophile balance ("HLB") value ranging from about 4 to about 15, such as, for example about 8 to about 14. A single surfactant can be used. Alternatively, multiple surfactants, such as two, three or more surfactants, can be used. For example, the surfactant can comprise a mixture of a first surfactant and a second surfactant, the first surfactant having an HLB value ranging from about 8 or 10 to about 14 or 15 and the second surfactant having an HLB value ranging from about 4 to about 8 or 10, the first surfactant having a higher HLB value than the second surfactant.

In an embodiment, the surfactant can be a nonionic linear or branched alcohol ethoxylate compound of general formula $RO(CH_2CH_2O)_xH$, where R is an alkyl group ranging from $C_6$ to $C_{18}$ and x is a positive integer ranging from 1 to 15. Other examples of suitable surfactants include polyethylene glycol and polyethylene glycol trimethylnonyl ether. Examples of nonionic surfactants include secondary alcohol ethoxylates such as the Tergitol® 15-S series supplied by Dow Chemical Company. In an embodiment, the surfactants are branched secondary alcohol ethoxylates such as a branched secondary alcohol ethoxylate with 6 to 12 moles of ethylene oxide (EO). Examples of suitable commercially available surfactants include the Tergitol® TMN series also supplied by Dow Chemical Company, such as Tergitol TMN-6, a branched secondary alcohol ethoxylate and Tergitol 15-s-7, a secondary alcohol ethoxylate. Formula 1 below is a general formula for surfactant compounds employed in the Tergitol series. Surfactants of formula 1 can have any suitable integer value for n, such as, for example, 1 to 15, or 6 to 12. For TMN-6 the valued of n is about 8. TMN-10 and TMN-100 are also potential candidates, which values for n of about 11 and 10, respectively.

Formula 1

Tergitol®
TMN-6 (n~8)
TMN-10 (n~11)
TMN-100 (n~10)

In an embodiment, the cloud point for the alcohol ethoxylate is above 30° C. Any other suitable surfactants can also be employed.

To form the sacrificial coatings, a wet coating composition as described herein is applied to the intermediate transfer member ("ITM"), where it is semi-dried or dried to form the coating. The coating can have a higher surface energy and/or be more hydrophilic than the base ITM, which is usually a material with low surface free energy, for example, a polysiloxane such as polydimethylsiloxane or other silicone rubber material, fluorosilicone, TEFLON, polyimide or combinations thereof.

In an embodiment, the wet coating composition for forming the sacrificial coating is made by mixing the ingredients comprising: at least one hydrophilic polymer; at least one hygroscopic material; at least one oil-in-water emulsion, at least one surfactant and one or more liquid vehicles, such as water. Any of the hydrophilic polymers, hygroscopic materials, oil-in-water emulsions and surfactants described herein can be employed.

The ingredients of the wet coating composition can be mixed in any suitable manner to form a composition that can be coated onto the intermediate transfer member. In addition to the ingredients discussed above, the mixture can include other ingredients, such as solvents, liquid carriers and biocides. Examples of biocides include ACTICIDES® CT, ACTICIDES® LA 1209 and ACTICIDES® MBS from about 0.001 weight percent to about 0.2 weight percent of the active ingredient. Examples of suitable liquid vehicles include isopropanol and MEK (methyl ethyl ketone) or combinations thereof in water.

The total amount of water in the wet composition prior to coating can be any suitable amount. In an embodiment, the total amount of water can be 60% by weight or more, such as from about 70 to about 97% by weight, or about 80 to about 95% by weight, relative to the total weight of the composition.

The ingredients can be mixed in any suitable amounts. For example, the hydrophilic polymer can be added in an amount of from about 0.5 to about 30% by weight, or from about 1 to about 10% by weight, or from about 1.5 to about 5% by weight based upon the total weight of the coating mixture. The at least one oil-in-water emulsion can be present in an amount ranging from about 0.05% to about 8% by weight relative to the total weight of the coating mixture, such as about 0.1% to about 6% or about 0.2% to about 1, about 2 or about 4%. The surfactants can be present in an amount of from about 0.01 to about 4 weight percent, or from about 0.1 to about 2 weight percent, or from about 0.2 to about 0.5 or 1 weight percent, based upon the total weight of the coating mixture. The hygroscopic material can be present in an amount of from about 0.5 to about 30 weight percent, or from about 2 to about 25 weight percent, or from about 5 to about 20 weight percent, based upon the total weight of the coating mixture. For example, the amount of hydroscopic material can be in an amount of from about 0.5 to about 15 weight percent, or from about 2 to about 10 weight percent, or from about 3 to about 8 weight percent, based upon the total weight of the coating mixture.

Figure 2:
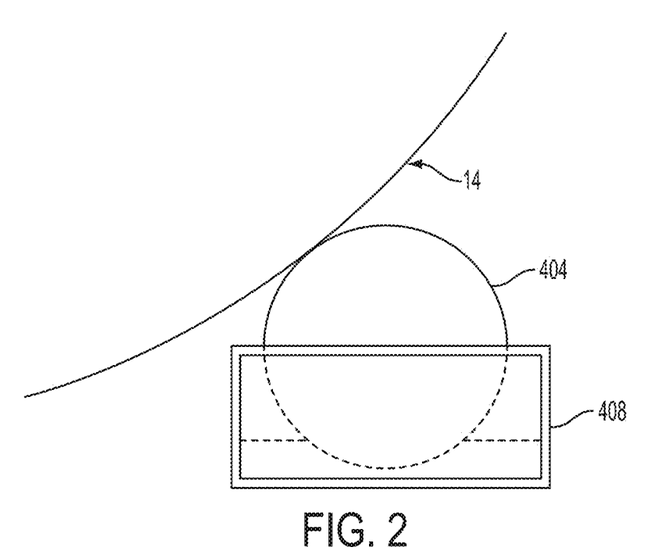
FIG. 2 is a schematic drawing of a surface maintenance unit that applies a hydrophilic sacrificial coating composition to a surface of an intermediate transfer member in an inkjet printer, according to an embodiment of the present disclosure.

The compositions of the present disclosure can be used to form a sacrificial coating over any suitable substrate. Any suitable coating method can be employed, including, but not limited to, dip coating, spray coating, spin coating, flow coating, stamp printing, die extrusion coatings, flexo and gravure coating and/or blade techniques. In exemplary embodiments, suitable methods that can be employed to coat the liquid sacrificial coating composition on an intermediate transfer member include use of an anilox roller, as shown in FIG. 2, or an air atomization device such as an air brush or an automated air/liquid sprayer can be used for spray coating. In another example, a programmable dispenser can be used to apply the coating material to conduct a flow coating.

In embodiments, the sacrificial coating can first be applied or disposed as a wet coating on an intermediate transfer member. A drying or curing process can then be employed. In embodiments, the wet coating can be heated at an appropriate temperature for the drying and curing, depending on the material or process used. For example, the wet coating can be heated to a temperature ranging from about 30° C. to about 200° C. for about 0.01 to about 10 seconds or from about 0.1 second to about 2 seconds. In embodiments, after the drying and curing process, the sacrificial coating can have a thickness ranging from about 0.02 micrometer to about 10 micrometers, or from about 0.02 micrometer to about 5 micrometers, or from about 0.05 micrometer to about 1 micrometers.

Methods of making the compositions and sacrificial coatings of the present disclosure are also taught in co-pending U.S. application Ser. No. 14/493,569, filed Sep. 23, 2014, the disclosure of which is incorporated herein by reference in its entirety.

In an embodiment, the sacrificial coating can cover a portion of a major surface of the intermediate transfer member. The major outer surface of the intermediate transfer member can comprise, for example, silicone or a fluorinated polymer.

It has been found that the sacrificial coating reduces the wet image quality problem discussed above by providing an ink wetting surface on the intermediate transfer member. The coatings may also improve the image cohesion significantly to enable excellent image transfer.

Figure 1:
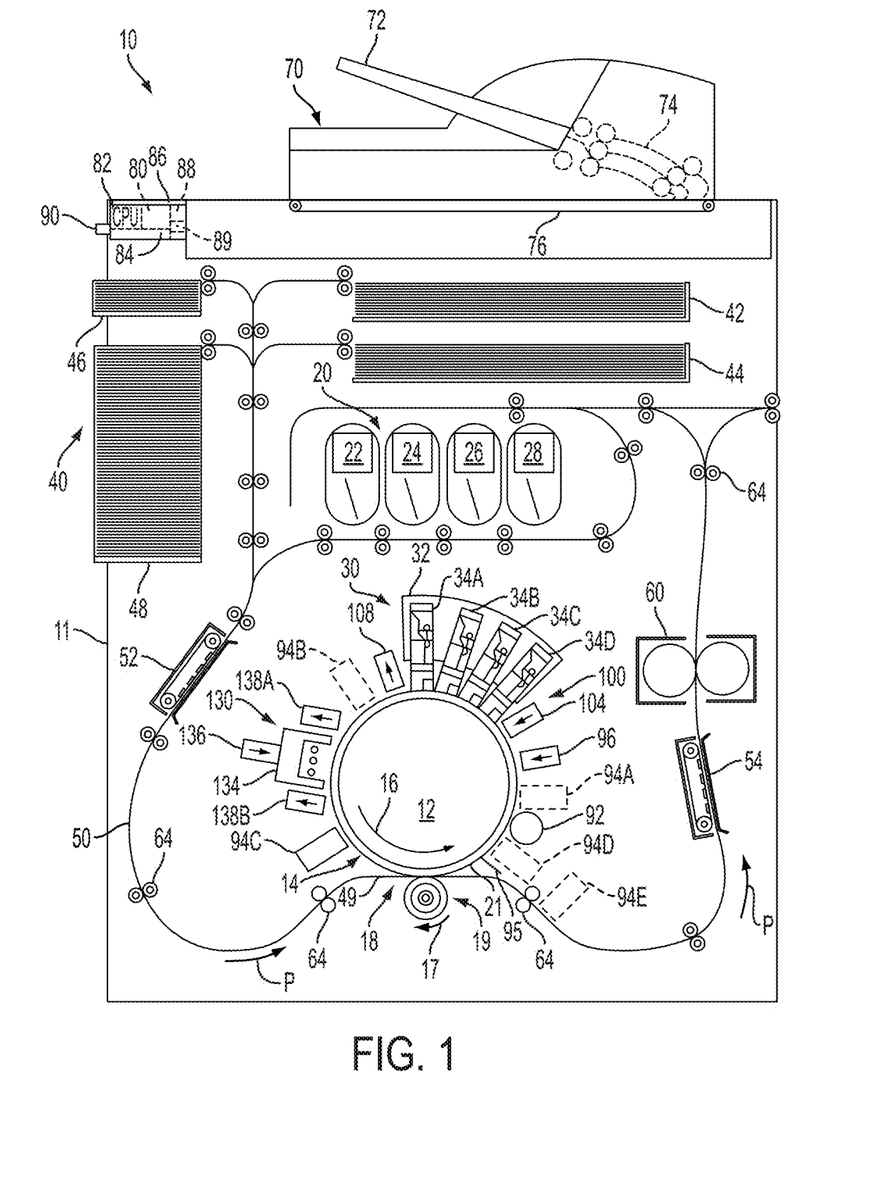
FIG. 1 is a schematic drawing of an aqueous indirect inkjet printer that prints sheet media, according to an embodiment of the present disclosure.

FIG. 1 illustrates a high-speed aqueous ink image producing machine or printer 10. As illustrated, the printer 10 is an indirect printer that forms an ink image on a surface of a blanket 21 mounted about an intermediate rotating member 12 and then transfers the ink image to media passing through a nip 18 formed between the blanket 21 and the transfix roller 19. The surface 14 of the blanket 21 is referred to as the image receiving surface of the blanket 21 and the rotating member 12 since the surface 14 receives a hydrophilic composition and the aqueous ink images that are transfixed to print media during a printing process. A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media.

The printer 10 includes a frame 11 that supports directly or indirectly operating subsystems and components, which are described below. The printer 10 includes an intermediate transfer member, which is illustrated as rotating imaging drum 12 in FIG. 1, but can also be configured as a supported endless belt. The imaging drum 12 has an outer blanket 21 mounted about the circumference of the drum 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a print medium 49. In some embodiments, a heater in the drum 12 (not shown) or in another location of the printer heats the image receiving surface 14 on the blanket 21 to a temperature in a range of, for example, approximately 40° C. to approximately 70° C. The elevated temperature promotes partial drying of the liquid vehicle that is used to deposit the hydrophilic composition and of the water in the aqueous ink drops that are deposited on the image receiving surface 14.

The blanket is formed of a material having a relatively low surface energy to facilitate transfer of the ink image from the surface of the blanket 21 to the print medium 49 in the nip 18. Such materials include polysiloxanes, fluorosilicones, polyimides, fluoropolymers such as VITON or TEFLON and the like. A surface maintenance unit (SMU) 92 removes residual ink left on the surface of the blanket 21 after the ink images are transferred to the print medium 49. The low energy surface of the blanket does not aid in the formation of good quality ink images because such surfaces do not spread ink drops as well as high energy surfaces.

In an embodiment more clearly depicted in FIG. 2, the SMU 92 includes a coating applicator, such as a donor roller 404, which is partially submerged in a reservoir 408 that holds a sacrificial coating composition. The donor roller 404 rotates in response to the movement of the image receiving surface 14 in the process direction. The donor roller 404 draws the liquid sacrificial coating composition from the reservoir 408 and deposits a layer of the composition on the image receiving surface 14. As described below, the sacrificial coating composition is deposited as a uniform layer having any desired thickness. Examples include thicknesses ranging from about 0.1 µm to about 10 µm. The SMU 92 deposits the sacrificial wet coating composition on the image receiving surface 14. After a drying process, the dried sacrificial coating substantially covers the image receiving surface 14 before the printer ejects ink drops during a print process. In some illustrative embodiments, the donor roller 404 is an anilox roller or an elastomeric roller made of a material, such as rubber. The SMU 92 can be operatively connected to a controller 80, described in more detail below, to enable the controller to operate the donor roller, as well as a metering blade and a cleaning blade, selectively to deposit and distribute the coating material onto the surface of the blanket and to remove un-transferred ink and any sacrificial coating residue from the surface of the blanket 21.

Referring back to FIG. 1, the printer 10 includes a dryer 96 that emits heat and optionally directs an air flow toward the sacrificial coating composition that is applied to the image receiving surface 14. The dryer 96 facilitates the evaporation of at least a portion of the liquid vehicle from the sacrificial coating composition to leave a dried layer on the image receiving surface 14 before the intermediate transfer member passes the printhead modules 34A-34D to receive the aqueous printed image.

The printer 10 can include an optical sensor 94A, also known as an image-on-drum ("IOD") sensor, which is configured to detect light reflected from the blanket surface 14 and the sacrificial coating applied to the blanket surface as the member 12 rotates past the sensor. The optical sensor 94A includes a linear array of individual optical detectors that are arranged in the cross-process direction across the blanket 21. The optical sensor 94A generates digital image data corresponding to light that is reflected from the blanket surface 14 and the sacrificial coating. The optical sensor 94A generates a series of rows of image data, which are referred to as "scanlines," as the intermediate transfer member 12 rotates the blanket 21 in the direction 16 past the optical sensor 94A. In one embodiment, each optical detector in the optical sensor 94A further comprises three sensing elements that are sensitive to wavelengths of light corresponding to red, green, and blue (RGB) reflected light colors. Alternatively, the optical sensor 94A includes illumination sources that shine red, green, and blue light or, in another embodiment, the sensor 94A has an illumination source that shines white light onto the surface of blanket 21 and white light detectors are used. The optical sensor 94A shines complementary colors of light onto the image receiving surface to enable detection of different ink colors using the photodetectors. The image data generated by the optical sensor 94A can be analyzed by the controller 80 or other processor in the printer 10 to identify the thickness of the sacrificial coating on the blanket and the area coverage. The thickness and coverage can be identified from either specular or diffuse light reflection from the blanket surface and/or coating. Other optical sensors, such as 94B, 94C, and 94D, are similarly configured and can be located in different locations around the blanket 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow can be through the print zone as a whole or about one or more printhead arrays. The regulation of the air flow helps prevent evaporated solvents, liquid carriers and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the temperature, flow, and humidity of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes, for example, four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the blanket and ejects ink drops onto the surface 14 of the blanket 21. A printhead module can include a single printhead or a plurality of printheads configured in a staggered arrangement. Each printhead module is operatively connected to a frame (not shown) and aligned to eject the ink drops to form an ink image on the coating on the blanket surface 14. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the blanket surface 14 exits the print zone, the image passes under an image dryer 130. The image dryer 130 includes a heater, such as a radiant infrared, radiant near infrared and/or a forced hot air convection heater 134, a dryer 136, which is illustrated as a heated air source 136, and air returns 138A and 138B. The infrared heater 134 applies infrared heat to the printed image on the surface 14 of the blanket 21 to evaporate water or other liquid vehicles in the ink. The heated air source 136 directs heated air over the ink to supplement the evaporation of the water or liquid vehicle from the ink. In one embodiment, the dryer 136 is a heated air source with the same design as the dryer 96. While the dryer 96 is positioned along the process direction to dry the hydrophilic composition, the dryer 136 is positioned along the process direction after the printhead modules 34A-34D to at least partially dry the aqueous ink on the image receiving surface 14. The air is then collected and evacuated by air returns 138A and 138B to reduce the interference of the air flow with other components in the printing area.

As further shown, the printer 10 includes a print medium supply and handling system 40 that stores, for example, one or more stacks of paper print mediums of various sizes. The print medium supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut print mediums 49, for example. The print medium supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the intermediate transfer member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Although the printer 10 in FIG. 1 is described as having a blanket 21 mounted about an intermediate rotating member 12, other configurations of an image receiving surface can be used. For example, the intermediate rotating member can have a surface integrated into its circumference that enables an aqueous ink image to be formed on the surface. Alternatively, a blanket is configured as an endless rotating belt for formation of an aqueous image. Other variations of these structures can be configured for this purpose. As used in this document, the term "intermediate imaging surface" includes these various configurations.

Once an image or images have been formed on the blanket and coating under control of the controller 80, the illustrated inkjet printer 10 operates components within the printer to perform a process for transferring and fixing the image or images from the blanket surface 14 to media. In the printer 10, the controller 80 operates actuators to drive one or more of the rollers 64 in the media transport system 50 to move the print medium 49 in the process direction P to a position adjacent the transfix roller 19 and then through the transfix nip 18 between the transfix roller 19 and the blanket 21. The transfix roller 19 applies pressure against the back side of the print medium 49 in order to press the front side of the print medium 49 against the blanket 21 and the intermediate transfer member 12. Although the transfix roller 19 can also be heated, in the exemplary embodiment of FIG. 1, the transfix roller 19 is unheated. Instead, the pre-heater assembly 52 for the print medium 49 is provided in the media path leading to the nip. The pre-conditioner assembly 52 conditions the print medium 49 to a predetermined temperature that aids in the transferring of the image to the media, thus simplifying the design of the transfix roller. The pressure produced by the transfix roller 19 on the back side of the heated print medium 49 facilitates the transfixing (transfer and fusing) of the image from the intermediate transfer member 12 onto the print medium 49. The rotation or rolling of both the intermediate transfer member 12 and transfix roller 19 not only transfixes the images onto the print medium 49, but also assists in transporting the print medium 49 through the nip. The intermediate transfer member 12 continues to rotate to enable the printing process to be repeated.

After the intermediate transfer member moves through the transfix nip 18, the image receiving surface passes a cleaning unit that removes residual portions of the sacrificial coating and small amounts of residual ink from the image receiving surface 14. In the printer 10, the cleaning unit is embodied as a cleaning blade 95 that engages the image receiving surface 14. The blade 95 is formed from a material that wipes the image receiving surface 14 without causing damage to the blanket 21. For example, the cleaning blade 95 is formed from a flexible polymer material in the printer 10. As depicted below in FIG. 1, another embodiment has a cleaning unit that includes a roller or other member that applies a mixture of water and detergent to remove residual materials from the image receiving surface 14 after the intermediate transfer member moves through the transfix nip 18. As used herein, the term "detergent" or cleaning agent refers to any surfactant, liquid vehicle, or other chemical compound that is suitable for removing any sacrificial coating and any residual ink that may remain on the image receiving surface from the image receiving surface. One example of a suitable detergent is sodium stearate, which is a compound commonly used in soap. Another example is IPA, which is common solvent that is very effective to remove ink residues from the image receiving surface. In an embodiment, no residue of the sacrificial coating layer remains on the ITM after transferring the ink and sacrificial layer, in which case cleaning of the ITM to remove residual sacrificial coating may not be an issue.

Figure 3:
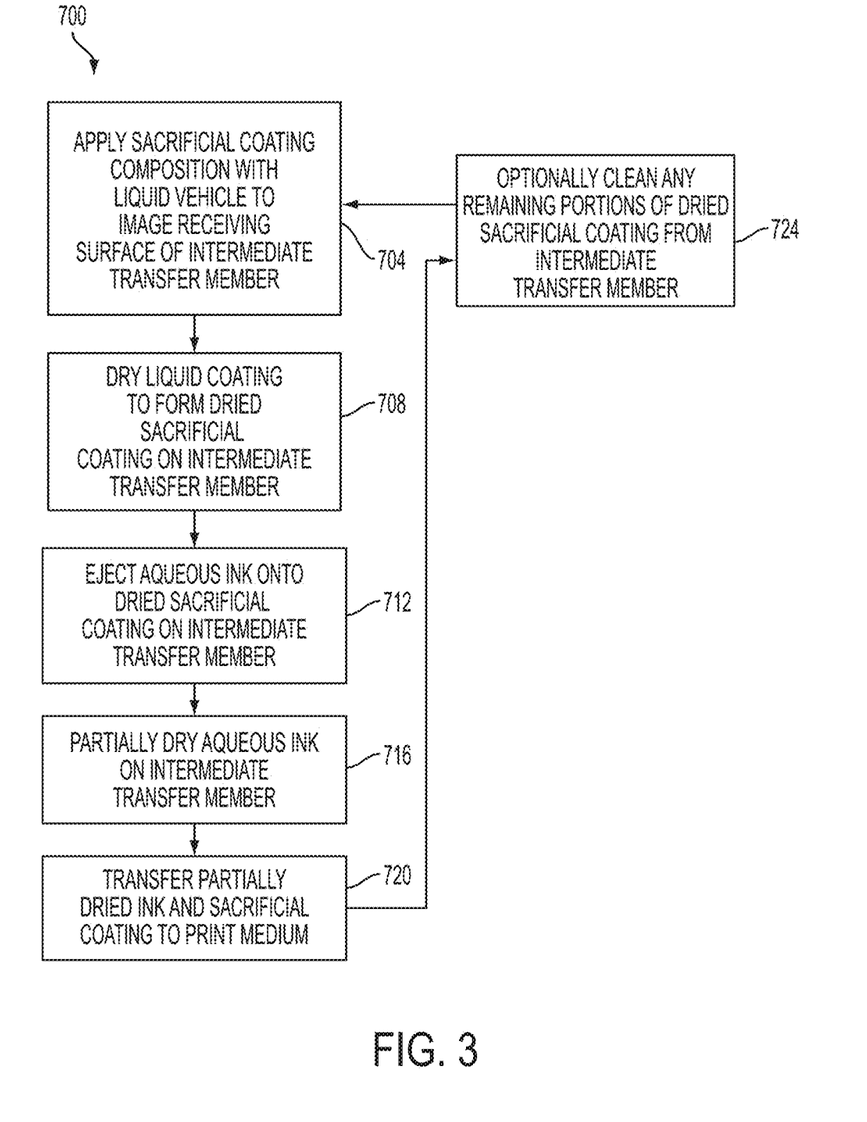
FIG. 3 is a block diagram of a process for printed images in an indirect inkjet printer that uses aqueous inks, according to an embodiment of the present disclosure.

FIG. 3 depicts a process 700 for operating an aqueous indirect inkjet printer using a sacrificial coating composition, as described herein, to form a dried coating on an image receiving surface of an intermediate transfer member prior to ejecting liquid ink drops onto the dried layer. In the discussion below, a reference to the process 700 performing an action or function refers to a controller, such as the controller 80 in the printer 10, executing stored programmed instructions to perform the action or function in conjunction with other components of the printer. The process 700 is described in conjunction with FIG. 1 showing the printer 10, and FIG. 4A-FIG. 4E showing the blanket and coatings, for illustrative purposes. The sacrificial coatings and processes of employing these coatings are not limited to use with printer 10, but can potentially be employed with any inkjet printer comprising an intermediate transfer member, as would be readily understood by one of ordinary skill in the art.

Process 700 begins as the printer applies a layer of a sacrificial composition with a liquid vehicle to the image receiving surface of the intermediate transfer member (block 704). In the printer 10, the drum 12 and blanket 21 move in the process direction along the indicated circular direction 16 during the process 700 to receive the sacrificial coating composition.

Figure 4A:
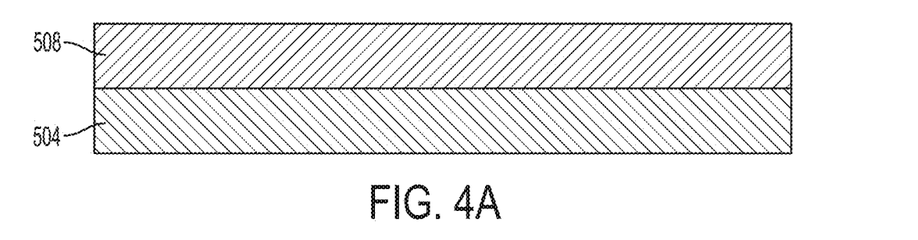
FIG. 4A is a side view of a hydrophilic sacrificial coating composition that is formed on the surface of an intermediate transfer member in an inkjet printer, according to an embodiment of the present disclosure.

In an embodiment, the liquid vehicle is water or another liquid, such as alcohol, which partially evaporates from the image receiving surface and leaves a dried layer on the image receiving surface. In FIG. 4A, the surface of the intermediate transfer member 504 is covered with the sacrificial coating composition 508. The SMU 92 deposits the sacrificial coating composition on the image receiving surface 14 of the blanket 21 to form a uniform hydrophilic coating. A greater coating thickness of the sacrificial coating composition enables formation of a uniform layer that completely covers the image receiving surface, but the increased volume of liquid vehicle in the thicker coating requires additional drying time or larger dryers to remove the liquid vehicle to form a dried layer. Thinner coatings of the sacrificial coating composition require the removal of a smaller volume of the liquid vehicle to form the dried layer, but if the sacrificial coating is too thin, then the coating may not fully cover the image receiving surface. In certain embodiments the sacrificial coating composition with the liquid vehicle is applied at a thickness of between approximately 1 μm and 10 μm.

Figure 4B:
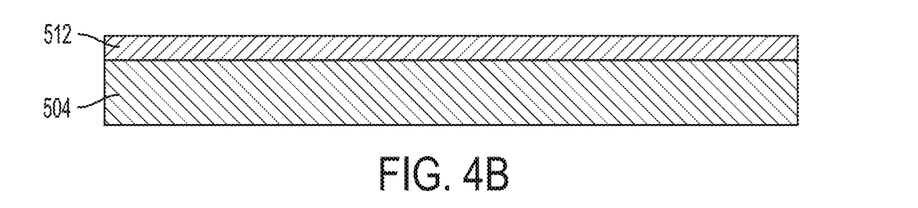
FIG. 4B is a side view of dried or semi-dried hydrophilic sacrificial coating composition on the surface of the intermediate transfer member after a dryer removes a portion of a liquid vehicle in the hydrophilic sacrificial coating composition, according to an embodiment of the present disclosure.

Process 700 continues as a dryer in the printer dries the sacrificial coating composition to remove at least a portion of the liquid vehicle and to form a dried layer on the image receiving surface (block 708). In the printer 10 the dryer 96 applies radiant heat and optionally includes a fan to circulate air onto the image receiving surface of the drum 12 or belt 13. FIG. 4B depicts the dried layer 512. The dryer 96 removes of a portion of the liquid vehicle, which decreases the thickness of the layer of dried layer that is formed on the image receiving surface. In the printer 10 the thickness of the dried layer 512 can be any suitable desired thickness. Example thicknesses range from about 0.1 μm to about 3 μm in different embodiments, and in certain specific embodiments from about 0.1 to about 0.5 μm.

The dried sacrificial coating 512 is also referred to as a "skin" layer. The dried sacrificial coating 512 has a uniform thickness that covers substantially all of the portion of the image receiving surface that receives aqueous ink during a printing process. As described above, while the wet sacrificial coating composition includes solutions, suspension, or dispersion of the sacrificial coating material in a liquid vehicle, the dried sacrificial coating 512 covers the image receiving surface of intermediate transfer member 504. The dried sacrificial coating 512 has a comparatively high level of adhesion to the image receiving surface of intermediate transfer member 504, and a comparatively low level of adhesion to a print medium that contacts the dried layer 512. As described in more detail below, when aqueous ink drops are ejected onto portions of the dried layer 512, a portion of the water and other liquid vehicles in the aqueous ink permeates the dried layer 512.

Process 700 continues as the image receiving surface with the hydrophilic skin layer moves past one or more printheads that eject aqueous ink drops onto the dried layer and the image receiving surface to form a latent aqueous printed image (block 712). The printhead modules 34A-34D in the printer 10 eject ink drops in the CMYK colors to form the printed image.

Figure 4C:
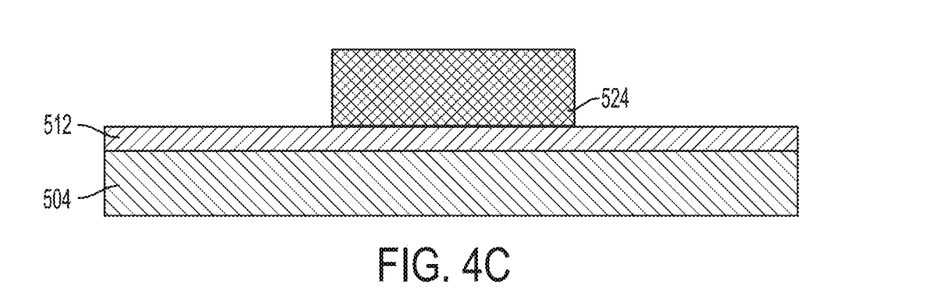
FIG. 4C is a side view of a portion of an aqueous ink image that is formed on the dried or semi-dried hydrophilic sacrificial coating composition on the surface of the intermediate transfer member, according to an embodiment of the present disclosure.

The sacrificial coating 512 is substantially impermeable to the colorants in the ink 524, and the colorants remain on the surface of the dried layer 512 where the aqueous ink spreads. The spread of the liquid ink enables neighboring aqueous ink drops to merge together on the image receiving surface instead of beading into individual droplets as occurs in traditional low-surface energy image receiving surfaces.

Figure 4D:
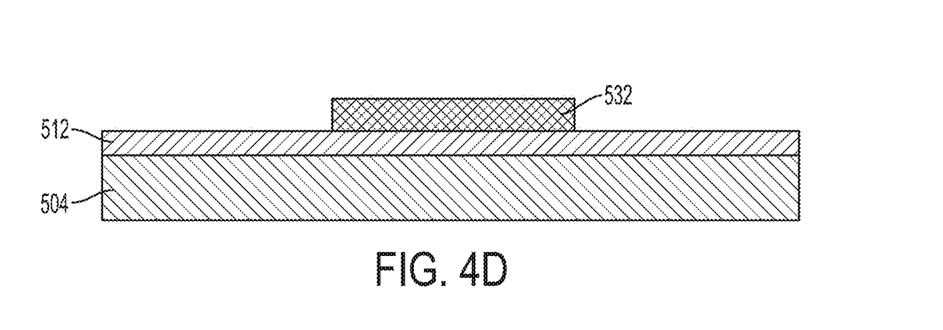
FIG. 4D is a side view of a portion of the aqueous ink image that is formed on the dried hydrophilic sacrificial coating composition after a dryer in the printer removes a portion of the water in the aqueous ink, according to an embodiment of the present disclosure.

Referring again to FIG. 3, the process 700 continues with a partial drying process of the aqueous ink on the intermediate transfer member (block 716). The drying process removes a portion of the water from the aqueous ink and the sacrificial coating, also referred to as the skin layer, on the intermediate transfer member so that the amount of water that is transferred to a print medium in the printer does not produce cockling or other deformations of the print medium. In the printer 10, the heated air source 136 directs heated air toward the image receiving surface 14 to dry the printed aqueous ink image. In some embodiments, the intermediate transfer member and blanket are heated to an elevated temperature to promote evaporation of liquid from the ink. For example, in the printer 10, the imaging drum 12 and blanket 21 are heated to a temperature ranging from about 40° C. to about 70° C. to enable partial drying of the ink in the dried layer during the printing process. As depicted in FIG. 4D, the drying process forms a partially dried aqueous ink 532 that retains a reduced amount of water compared to the freshly printed aqueous ink image of FIG. 4C.

The drying process increases the viscosity of the aqueous ink, which changes the consistency of the aqueous ink from a low-viscosity liquid to a higher viscosity tacky material. The drying process also reduces the thickness of the ink 532. The drying process removes sufficient water so that the ink is substantially dry. In an embodiment, the substantially dry ink contains less that 5% water and other liquid vehicles by weight, such as less than 2% water and other liquid vehicles, or even less than 1% water and other liquid vehicles, by weight of the ink.

Figure 4E:
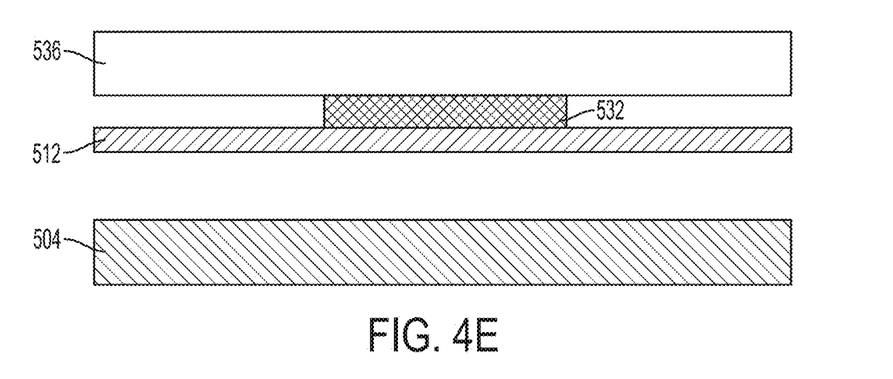
FIG. 4E is a side view of a print medium that receives the aqueous ink image and a portion of the dried layer of the hydrophilic composition after a transfix operation in the inkjet printer, according to an embodiment of the present disclosure.

Process 700 continues as the printer transfixes the latent aqueous ink image from the image receiving surface to a print medium, such as a sheet of paper (block 720). In the printer 10, the image receiving surface 14 of the drum 12 engages the transfix roller 19 to form a nip 18. A print medium, such as a sheet of paper, moves through the nip between the drum 12 and the transfix roller 19. The pressure in the nip transfers the latent aqueous ink image and a portion of the dried layer to the print medium. After passing through the transfix nip 18, the print medium carries the printed aqueous ink image. As depicted in FIG. 4E, a print medium 536 carries a printed aqueous ink image 532 with the sacrificial coating 512 covering the ink image 532 on the surface of the print medium 536. The sacrificial coating 512 provides protection to the aqueous ink image from scratches or other physical damage while the aqueous ink image 532 dries on the print medium 536.

During process 700, the printer cleans any residual portions of the sacrificial coating 512 that may remain on the image receiving surface after the transfixing operation (block 724). In one embodiment, a fluid cleaning system 395 uses, for example, a combination of water and a detergent with mechanical agitation on the image receiving surface to remove the residual portions of the sacrificial coating 512 from the surface of the belt 13. In the printer 10, a cleaning blade 95, which can be used in conjunction with water, engages the blanket 21 to remove any residual sacrificial coating 512 from the image receiving surface 14. The cleaning blade 95 is, for example, a polymer blade that wipes residual portions of the sacrificial coating 512 from the blanket 21.

During a printing operation, process 700 returns to the processing described above with reference to block 704 to apply the hydrophilic, wet sacrificial coating composition to the image receiving surface, print additional aqueous ink images, and transfix the aqueous ink images to print media for additional printed pages in the print process. The illustrative embodiment of the printer 10 operates in a "single pass" mode that forms the dried layer, prints the aqueous ink image and transfixes the aqueous ink image to a print medium in a single rotation or circuit of the intermediate transfer member. In alternative embodiments, an inkjet employs a multi-pass configuration where the image receiving surface completes two or more rotations or circuits to form the dried layer and receive the aqueous ink image prior to transfixing the printed image to the print medium.

In some embodiments of the process 700, the printer forms printed images using a single layer of ink such as the ink that is depicted in FIG. 4C. In the printer 10, however, the multiple printhead modules enable the printer to form printed images with multiple colors of ink. In other embodiments of the process 700, the printer forms images using multiple ink colors. In some regions of the printed image, multiple colors of ink may overlap in the same area on the image receiving surface, forming multiple ink layers on the hydrophilic composition layer. The method steps in FIG. 3 can be applied to the multiple ink layer circumstance with similar results.

EXAMPLES

Example 1

Oil Emulsion Preparation

Five oil emulsions were prepared by loading a silicone oil, Wacker AK 500 available from Wacker Chemie AG, (viscosity 500 cps) into TERGITOL TMN-6 surfactant. The loading levels are 2.5%, 5%, 7.5%, 10% and 20%. The oil-surfactant mixture was mixed using a Polytron at speed of 7000 rpm at room temperature for 1 minute. Some oil loaded at 20% was separated from surfactant. All the other 4 mixtures were very stable over a few days.

Example 2

Undercoat Composition

Table 1 shows a formulation (composition 2A) prepared with polyvinyl alcohol and oil emulsion and a formulation (composition 2B) prepared with TMN-6 surfactant without oil. The oil emulsion of composition 2A was prepared with 10% AK500 silicone oil and 90% TERGITOL TMN-6 surfactant. All these solutions are very stable.

TABLE 1

PVOH - oil emulsion vs. TMN-6 only

| Composition | PVOH | Emission of Tergitol TMN-6/AK500 oil (ratio = 90:10) (%) | Surfactant TMN-6 Loading | Glycerol | DI Water | Total |
|---|---|---|---|---|---|---|
| 2A | 1.50% | 0.25% | — | 5.0% | 93.25% | 100.00% |
| 2B | 1.50% | — | 0.25% | 5.0% | 93.25% | 100.00% |

Example 3

Coating Process

The undercoat compositions 2A and 2B were coated on a blanket substrate using a Pamarco anilox roll 165Q13 by hand. The substrate surface was coated with a film comprising a fluorinated polymer (DAI-EL™ G-621 manufactured by Daikin Industries, Ltd.) and AO700 (an aminoethyl-aminopropyl trimethoxysilane crosslinker from Gelest). The hotplate was setup at 60° C. while the substrate temperature was around 50° C. The wet film thickness was around 4-5 microns and the dry film thickness was around 500 nm to 1.5 microns. The coated film was dried in oven at 60° C. for 30 seconds.

Example 4

Optical Microscope Images—Film Forming Property Evaluation

Figure 5:
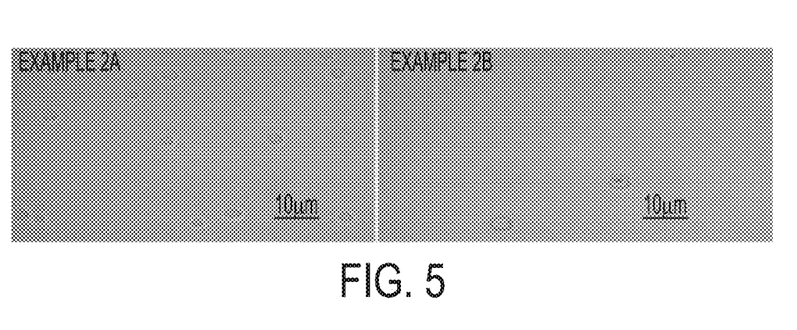
FIG. 5 shows optical microscope images taken of sacrificial coatings, as described in the examples below.

In order to make ink having good wetting and spreading on the undercoat film, it is desirable to achieve a continuous uniform film with the undercoat solution. To determine whether continuous uniform films were formed, optical microscope images were taken of the films formed in Example 3. These images are shown in FIG. 5.

Both Composition 2A and Composition 2B formed a continuous film, but with some defects on the surface. There were defects in both of the formulations, so these defects may be due to the fluorosilicone blanket, which was hand coated in the lab.

Example 5

Air Brush Transfer Test

A transfer test of the films of Example 3 was carried out using Collin ink PWK-1223. The ink was sprayed on the blankets coated with the dried films of Example 3 by air brush. The transfer condition was 320° F., 50 psi and 5 seconds dwell time. The ink was transferred from the blankets to 120 gsm Digital Color Elite Gloss paper.

Figure 6:
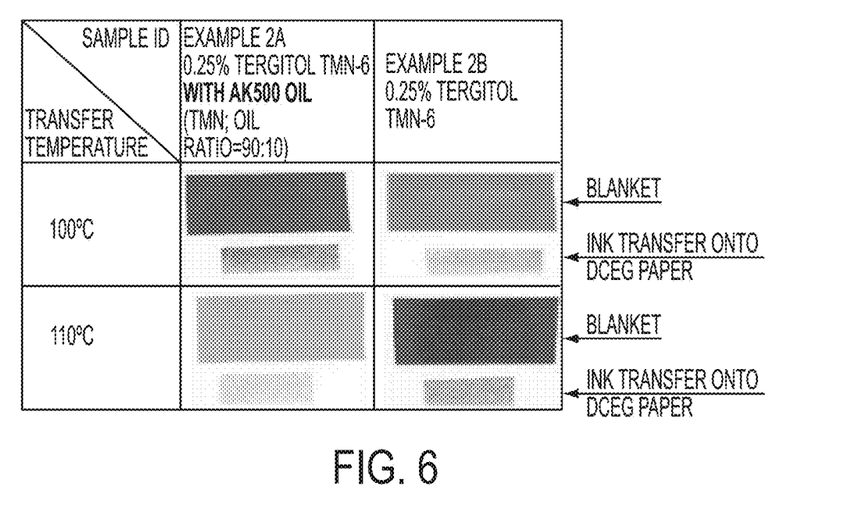
FIG. 6 shows images of ink transfer test results, as discussed in the examples below.

The images of FIG. 6 show the transfer results for the film of composition 2A (made with oil emulsion) vs. the film of composition 2B (made with TMN-6 surfactant only (no oil)) at different transfer temperatures. The top image is the blanket after transferred and the bottom image is the DCEG paper after ink was transferred. The ink tested here can only be transferred at around 120° C. for undercoat without loading of oil emulsion. There is much less residual ink on blanket for formulation with oil emulsion at lower transfer temperature. The transfer temperature can be dropped around 20° C. for formulation with oil emulsion (from 120° C. to 100° C.). The darker the DCEG paper, the better the ink transferred. These results show that the film made with the oil emulsion resulted in the reduction in transfer temperature and improved release properties.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An indirect printing apparatus comprising:
an intermediate transfer member; a sacrificial coating on the intermediate transfer member, the sacrificial coating made from ingredients comprising:
at least one hydrophilic polymer;
at least one hygroscopic material;
at least one oil-in-water emulsion; and
at least one surfactant,
a coating mechanism for forming the sacrificial coating onto the intermediate transfer member;
a drying station for drying the sacrificial coating;
at least one ink jet nozzle positioned proximate the intermediate transfer member and configured for jetting ink droplets onto the sacrificial coating formed on the intermediate transfer member;
an ink processing station configured to at least partially dry the ink on the sacrificial coating formed on the intermediate transfer member; and
a substrate transfer mechanism for moving a substrate into contact with the intermediate transfer member,
wherein the at least one hydrophilic polymer is polyvinyl alcohol having a hydrolysis degree ranging from about 75% to about 99.5% and weight average molecular weight ranging from about 8000 to about 30,000 g-mole$^{-1}$.

2. An indirect printing apparatus comprising:
an intermediate transfer member; a sacrificial coating on the intermediate transfer member, the sacrificial coating made by mixing ingredients to form a wet coating composition and then coating the wet coating composition onto the intermediate transfer member, the ingredients comprising:
at least one hydrophilic polymer;
at least one hygroscopic material;
at least one oil-in-water emulsion; and
at least one surfactant,
a coating mechanism for forming the sacrificial coating onto the intermediate transfer member;
a drying station for drying the sacrificial coating;
at least one ink jet nozzle positioned proximate the intermediate transfer member and configured for jetting ink droplets onto the sacrificial coating formed on the intermediate transfer member;
an ink processing station configured to at least partially dry the ink on the sacrificial coating formed on the intermediate transfer member; and
a substrate transfer mechanism for moving a substrate into contact with the intermediate transfer member.

3. The indirect printing apparatus of claim 2, wherein the at least one hydrophilic polymer is selected from the group consisting of polyvinyl alcohol, a copolymer of vinyl alcohol and alkene monomers, poly(vinylpyrrolidinone) ("PVP"), poly(ethylene oxide), hydroxyethyl cellulose, cellulose acetate, poly(ethylene glycol), copolymers of poly(ethylene glycol), polyacrylamide (PAM), poly(N-isopropylacrylamide) ("PNIPAM"), poly(acrylic acid), polymethacrylate, acrylic polymers, maleic anhydride copolymers, sulfonated polyesters, polysaccharides, waxy maize starches and the mixtures thereof.

4. The indirect printing apparatus of claim 2, wherein the at least one hydrophilic polymer is selected from waxy maize starches comprising more than 90 weight percent amylopectin.

5. The indirect printing apparatus of claim 2, wherein the at least one oil-in-water emulsion is present in an amount ranging from about 0.05% to about 8% by weight relative to the total composition weight.

6. The indirect printing apparatus of claim 2, wherein the at least one hygroscopic material is selected from the group consisting of glycerol, sorbitol, glycols, vinyl alcohols, xylitol, maltitol, polymeric polyols, glyceryl triacetate, glycouril, ionic liquids and mixtures thereof.

7. The indirect printing apparatus of claim 2, wherein the at least one oil-in-water emulsion comprises an oil selected from the group consisting of a silicone oil, a perfluoroether oil, a hydrocarbon oil and mixtures thereof.

8. The indirect printing apparatus of claim 7, wherein a viscosity of the silicone oil is less than 1000 centipoises.

9. The indirect printing apparatus of claim 2, wherein the at least one oil-in-water emulsion comprises a mineral oil selected from the group consisting of paraffinic oils, naphthenic oils, aromatic oils and mixtures thereof.

10. The indirect printing apparatus of claim 2, wherein the oil-in-water emulsion comprises at least one nonionic surfactant with hydrophile lipophile balance (HLB) value from 4 to 15.

11. The indirect printing apparatus of claim 2, wherein the surfactant comprises a mixture of a first surfactant and a second surfactant, the first surfactant having a hydrophile lipophile balance ("HLB") value ranging from about 8 to about 15 and the second surfactant having an HLB value ranging from about 4 to about 10, the HLB value for the first surfactant being higher that the HLB value for the second surfactant.

12. The indirect printing apparatus of claim 2, wherein the surfactant is a secondary alcohol ethoxylate.

13. The indirect printing apparatus of claim 2, wherein the surfactant is a branched secondary alcohol ethoxylate with 6 to 12 moles of ethylene oxide (EO).

14. The apparatus of claim 2, wherein the oil-in-water emulsion comprises an oil selected from the group consisting of a silicone oil and a hydrocarbon oil; and the at least one hydrophilic polymer is polyvinyl alcohol having a hydrolysis degree ranging from about 75% to about 99.5% and weight average molecular weight ranging from about 8000 to about 30,000 g-mole$^{-1}$.

15. An indirect printing process comprising:
providing an ink composition to an inkjet printing apparatus comprising an intermediate transfer member;
forming a sacrificial coating onto the intermediate transfer member, the sacrificial coating made by mixing ingredients to form a wet coating composition and then coating the wet coating composition onto the intermediate transfer member, the ingredients comprising:
at least one hydrophilic polymer;
at least one hygroscopic material;
at least one oil-in-water emulsion; and
at least one surfactant;
drying the sacrificial coating to form at least a partially dry sacrificial coating;
ejecting droplets of ink in an imagewise pattern onto the at least partially dry sacrificial coating;
at least partially drying the ink to form a substantially dry ink pattern on the intermediate transfer member; and
transferring both the substantially dry ink pattern and the at least partially dry sacrificial coating from the intermediate transfer member to a final substrate.

16. The process of claim 15, wherein the substantially dry ink pattern comprises less than 5% water and other liquid vehicles, based on the total weight of the dry ink.

17. The process of claim 15, wherein the oil is selected from the group consisting of a silicone oil and a hydrocarbon oil; and the at least one hydrophilic polymer is polyvinyl alcohol having a hydrolysis degree ranging from about 75% to about 99.5% and weight average molecular weight ranging from about 8000 to about 30,000 g-mole$^{-1}$.

18. The process of claim 15, wherein the at least one hydrophilic polymer is selected from the group consisting of polyvinyl alcohol, a copolymer of vinyl alcohol and alkene monomers, poly(vinylpyrrolidinone) ("PVP"), poly(ethylene oxide), hydroxyethyl cellulose, cellulose acetate, poly (ethylene glycol), copolymers of poly(ethylene glycol), polyacrylamide (PAM), poly(N-isopropylacrylamide) ("PNIPAM"), poly(acrylic acid), polymethacrylate, acrylic polymers, maleic anhydride copolymers, sulfonated polyesters, polysaccharides, and the mixtures thereof.

* * * * *